(12) United States Patent
Kunai

(10) Patent No.: US 9,709,719 B2
(45) Date of Patent: Jul. 18, 2017

(54) POLARIZER AND POLARIZING PLATE INCLUDING SAME

(71) Applicant: Sumitomo Chemical Company, Limited, Tokyo (JP)

(72) Inventor: Yuichiro Kunai, Arlington, MA (US)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/039,994

(22) PCT Filed: Nov. 18, 2014

(86) PCT No.: PCT/JP2014/080439
§ 371 (c)(1),
(2) Date: May 27, 2016

(87) PCT Pub. No.: WO2015/079967
PCT Pub. Date: Jun. 4, 2015

(65) Prior Publication Data
US 2017/0003426 A1    Jan. 5, 2017

(30) Foreign Application Priority Data
Nov. 29, 2013    (JP) .................... 2013-248082

(51) Int. Cl.
*G02B 5/30* (2006.01)
*G02B 1/08* (2006.01)
*G02B 1/14* (2015.01)

(52) U.S. Cl.
CPC ............. *G02B 5/3033* (2013.01); *G02B 1/08* (2013.01); *G02B 1/14* (2015.01); *G02B 5/305* (2013.01)

(58) Field of Classification Search
CPC .... G02B 5/3033; G02B 5/305; G02B 5/3083; G02B 1/08; G02B 1/14; G02F 1/133528; G02F 1/133538
(Continued)

(56) References Cited

U.S. PATENT DOCUMENTS 4,166,871 A    9/1979 Schuler
4,591,512 A    5/1986 Racich et al.
(Continued)

FOREIGN PATENT DOCUMENTS

JP    S6033245 B2    8/1985
JP    H0234001 B2    8/1990
(Continued)

OTHER PUBLICATIONS

Notice of Grounds of Rejection issued Mar. 17, 2015 in JP Application No. 2013248082.
(Continued)

*Primary Examiner* — Frank Font
(74) *Attorney, Agent, or Firm* — Panitch Schwarze Belisario & Nadel LLP

(57) ABSTRACT

Provided are a polarizer that resists red discoloration in a heat resistance test even when it has a small thickness, and a polarizing plate including the polarizer. The polarizer includes a polyvinyl alcohol-based resin layer and iodine adsorbed and oriented in the polyvinyl alcohol-based resin layer, and has a thickness less than or equal to 10 μm and a ratio of a retardation of iodine to a retardation of polyvinyl alcohol greater than or equal to 0.38.

6 Claims, 3 Drawing Sheets

(58) Field of Classification Search
USPC ..... 359/487.01, 487.02, 489.07; 349/96, 117
See application file for complete search history.

(56) References Cited

U.S. PATENT DOCUMENTS

| | | | |
|---|---|---|---|
| 6,362,862 B1* | 3/2002 | Itoh | G02F 1/13363 349/117 |
| 9,423,542 B2* | 8/2016 | Bae | B29D 11/00644 |
| 2005/0168669 A1* | 8/2005 | Nakamura | G02B 5/3083 349/96 |
| 2006/0098137 A1 | 5/2006 | Kameyama et al. | |
| 2006/0227423 A1 | 10/2006 | Saiki et al. | |
| 2007/0176230 A1 | 8/2007 | Uchida et al. | |
| 2009/0002608 A1 | 1/2009 | Kameyama et al. | |
| 2009/0185271 A1 | 7/2009 | Yaegashi et al. | |
| 2009/0323185 A1 | 12/2009 | Goto et al. | |
| 2011/0163281 A1* | 7/2011 | Bae | B29D 11/00644 252/585 |
| 2012/0052197 A1 | 3/2012 | Sawada et al. | |
| 2012/0055621 A1 | 3/2012 | Goto et al. | |
| 2012/0057104 A1 | 3/2012 | Kitagawa et al. | |
| 2012/0243089 A1 | 9/2012 | Araki et al. | |
| 2013/0299070 A1 | 11/2013 | Kawamura | |
| 2014/0016198 A1 | 1/2014 | Sawada et al. | |
| 2014/0044947 A1 | 2/2014 | Sawada et al. | |
| 2016/0025910 A1 | 1/2016 | Sawada et al. | |

FOREIGN PATENT DOCUMENTS

| | | |
|---|---|---|
| JP | 2000035512 A | 2/2000 |
| JP | 2004341503 A | 12/2004 |
| JP | 2005084505 A | 3/2005 |
| JP | 2006126722 A | 5/2006 |
| JP | 2007114581 A | 5/2007 |
| JP | 2008065222 A | 3/2008 |
| JP | 2008070571 A | 3/2008 |
| JP | 2009193047 A | 8/2009 |
| JP | 2009282137 A | 12/2009 |
| JP | 2010033007 A | 2/2010 |
| JP | 2010152374 A | 7/2010 |
| JP | 2011002816 A | 1/2011 |
| JP | 2011022202 A | 2/2011 |
| JP | 4691205 B1 | 6/2011 |
| JP | 2011215264 A | 10/2011 |
| JP | 4804588 B1 | 11/2011 |
| JP | 2012008234 A | 1/2012 |
| JP | 2012013764 A | 1/2012 |
| JP | 2012014001 A | 1/2012 |
| JP | 2012073563 A | 4/2012 |
| JP | 2012103466 A | 5/2012 |
| JP | 4950357 B1 | 6/2012 |
| JP | 2012198449 A | 10/2012 |
| JP | 2013210488 A | 10/2013 |
| JP | 2013238640 A | 11/2013 |
| WO | 2011125961 A1 | 10/2011 |
| WO | 2014148639 A1 | 9/2014 |

OTHER PUBLICATIONS

First Notice of Provision of Information by a Third Party issued Sep. 8, 2015 in JP Application No. 2013248082.
Second Notice of Provision of Information by a Third Party issued Sep. 8, 2015 in JP Application No. 2013248082.
Third Notice of Provision of Information by a Third Party issued Sep. 8, 2015 in JP Application No. 2013248082.
Notice of Grounds of Rejection issued Sep. 15, 2015 in JP Application No. 2013248082.
First Notice of Provision of Information by a Third Party issued Mar. 22, 2016 in JP Application No. 2013248082.
Second Notice of Provision of Information by a Third Party issued Mar. 22, 2016 in JP Application No. 2013248082.
International Search Report issued Dec. 22, 2014 in International Application No. PCT/JP2014/080439.
Decision to Grant issued Apr. 5, 2016 in JP Application No. 2013-248082.
Office Action issued Nov. 15, 2016 in KR Application No. 10-2016-7016694.
Office Action issued Jan. 22, 2017 in CN Application No. 201480065201.8.

* cited by examiner

POLARIZER AND POLARIZING PLATE INCLUDING SAME

CROSS-REFERENCE TO RELATED APPLICATION

This application is a Section 371 of International Application No. PCT/JP2014/080439 filed Nov. 18, 2014, which was published in the Japanese language on Jun. 4, 2015, under International Publication No. WO 2015/079967 A1, and the disclosure of which is incorporated herein by reference.

TECHNICAL FIELD

The invention relates to a polarizer and a polarizing plate including the same.

BACKGROUND ART

Polarizing plates are widely used in displays such as liquid crystal displays and, particularly in recent years, in a variety of mobile devices such as smart phones and slate PCs. For use in mobile devices, polarizing plates are increasingly required to be thin and light. On the other hand, polarizing plates are also required to have high heat resistance.

However, conventional polarizing plates can cause a problem called "red discoloration," in which light in the red region leaks from polarizing plates having undergone a heat resistance test (generally at 80 to 85° C. for 500 to 750 hours). Various methods have been proposed to suppress discoloration such as red discoloration.

Conventional methods for suppressing discoloration or decoloration of polarizers include, for example, a method of adding sulfate ions to polarizers (PTD 1); a method in which a process of immersing a film in an aqueous solution with a pH adjusted in a specific region is added to a polarizer producing process (PTDs 2 and 3); a method of forming a specific protective layer on a polarizer (PTD 4); a method of controlling the ratio between the contents of iodine and potassium in a polarizer (PTD 5); a method of improving the orientation of $I_3^-$ adsorbed in a polarizer (PTD 6); and a method of adding zinc ions to a polarizer (PTDs 7 to 9).

In this regard, PTDs 10 to 12 disclose that the amount of variations in the retardation Rpva of polyvinyl alcohol is used as a measure of the uniformity of a polarizer. In these literatures, however, only Rpva is used for the definition and there is no description on the orientation of iodine (the retardation Ri of iodine).

CITATION LIST

Patent Document

PTD 1: Japanese Patent Laying-Open No. 2009-193047
PTD 2: Japanese Patent Laying-Open No. 2009-282137
PTD 3: Japanese Patent Laying-Open No. 2008-070571
PTD 4: Japanese Patent Laying-Open No. 2008-065222
PTD 5: Japanese Patent Laying-Open No. 2007-114581
PTD 6: Japanese Patent Laying-Open No. 2004-341503
PTD 7: Japanese Patent Publication No. S60-033245
PTD 8: Japanese Patent Publication No. H02-034001
PTD 9: Japanese Patent Laying-Open No. 2000-035512
PTD 10: Japanese Patent Laying-Open No. 2010-152374
PTD 11: Japanese Patent Laying-Open No. 2012-008234
PTD 12: Japanese Patent Laying-Open No. 2012-014001

SUMMARY OF INVENTION

Technical Problems

As mentioned above, various methods capable of suppressing red discoloration are proposed. However, red discoloration can easily occur particularly in a polarizer with a small thickness, and the above methods are not considered to be sufficient measures to suppress the red discoloration of such a polarizer. In addition, the method of adding zinc ions raises other problems such as irritation to skin, environmental impact of waste water, and precipitation of zinc on the surface of a polarizer.

It is an object of the invention to provide a polarizer that resists red discoloration in a heat resistance test even when having a small thickness and to provide a polarizing plate including such a polarizer.

Solutions to Problems

The invention provides the following polarizer and polarizing plate.

[1] A polarizer, including: a polyvinyl alcohol-based resin layer; and iodine adsorbed and oriented in the polyvinyl alcohol-based resin layer, the polarizer having a thickness less than or equal to 10 μm and a ratio of a retardation of iodine to a retardation of polyvinyl alcohol greater than or equal to 0.38.

[2] A polarizing plate including the polarizer according to [1].

[3] The polarizing plate according to [2], further including a protective film bonded to at least one surface of the polarizer.

Advantageous Effects of Invention

When subjected to a heat resistance test, the polarizer and the polarizing plate of the invention can resist red discoloration and maintain neutral display although the thickness of the polarizer is as small as less than or equal to 10 μm.

DESCRIPTION OF EMBODIMENTS

<Polarizer and Polarizing Plate>

(1) Basic Structure of Polarizing Plate

Figure 1:
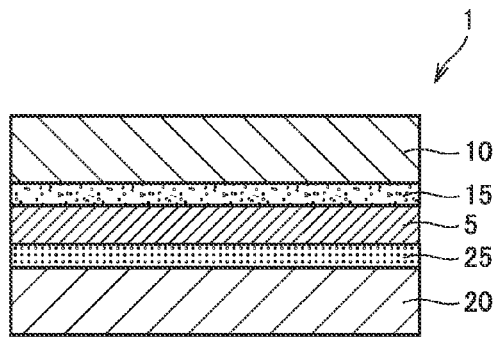
FIG. 1 is a schematic cross-sectional view showing an example of a layered structure of a polarizing plate according to the invention.

FIG. 1 is a schematic cross-sectional view showing an example of a layered structure of a polarizing plate according to the invention. As shown in FIG. 1, a polarizing plate 1 according to the invention may include a polarizer 5 with a thickness less than or equal to 10 μm, a first protective film 10 disposed on one surface of polarizer 5 with a first adhesive layer 15 interposed therebetween, and a second protective film 20 disposed on the other surface of polarizer 5 with a second adhesive layer 25 interposed therebetween. Polarizing plate 1 may further include an additional layer, such as any other optical function layer or pressure-sensitive adhesive layer, disposed on first protective film 10 and/or second protective film 20.

Figure 2:
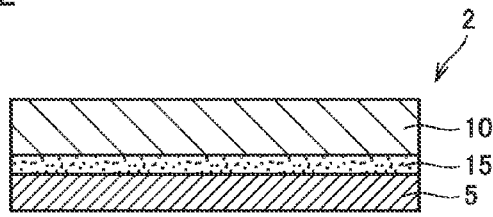
FIG. 2 is a schematic cross-sectional view showing another example of the layered structure of a polarizing plate according to the invention.

As shown in FIG. 2, the polarizing plate of the invention may also be a single side protective film-bearing polarizing plate 2 including a polarizer 5 with a thickness less than or equal to 10 μm and a first protective film 10 disposed on one surface of polarizer 5 with a first adhesive layer 15 interposed therebetween. Single side protective film-bearing polarizing plate 2 may further include an additional layer, such as any other optical function layer or pressure-sensitive adhesive layer, disposed on first protective film 10 and/or polarizer 5.

(2) Retardation Properties of Polarizer

In a first embodiment, the polarizing plate of the invention includes a polarizer that includes a uniaxially stretched polyvinyl alcohol-based resin layer and iodine adsorbed and oriented in the layer and has a thickness less than or equal to 10 μm, in which the polarizer has a ratio (Ri/Rpva) of a retardation (Ri) of iodine to a retardation (Rpva) of polyvinyl alcohol greater than or equal to 0.38. Ri/Rpva is preferably greater than or equal to 0.40, more preferably greater than or equal to 0.44. Since the thickness of polarizer 5 is as thin as less than or equal to 10 μm, water could come in and go out of polarizer 5 significantly faster than in and out of a conventional, relatively thick polarizer (about 35 μm in thickness), so that polarizer 5 could easily undergo red discoloration. However, even when subjected to a heat resistance test (generally at 80 to 85° C. for 500 to 750 hours), the polarizing plate of the invention having such retardation properties resists red discoloration, maintains neutral display, and has high heat resistance. Such high heat resistance (resistance to red discoloration) lasts for a long period of time even when the polarizing plate is practically used in a display such as a liquid crystal display.

In order to allow a thin film polarizer with a thickness less than or equal to 10 μm to resist red discoloration, the inventor has conducted a study to stabilize an iodine-polyvinyl alcohol complex by improving the orientation of polyvinyl alcohol. As a result, red discoloration could not be prevented only by improving the orientation of polyvinyl alcohol. As a result of a further study, it has been found that even when the orientation of polyvinyl alcohol is too high, the orientation of iodine is not always high. The reason for this may be as follows.

Polyvinyl alcohol, a crystalline polymer, has a crystal part (lamella), and this crystal part produces a retardation, so that the orientation of polyvinyl alcohol can be locally very high. It is suggested that, in particular, stretching methods can significantly grow the crystal lamella so that the measured degree of orientation can be significantly increased whereas the orientation of the amorphous part cannot be so increased due to the influence of too many crystal crosslink points. In particular, the amorphous part of polyvinyl alcohol is involved in the formation of an iodine-polyvinyl alcohol complex capable of producing a long-wavelength absorption band. Therefore, in order to stabilize and not to degrade the long-wavelength absorption band, it is necessary to increase the orientation of the polyvinyl alcohol chain in the amorphous part and not to increase the crystal part so much.

The inventor has accomplished the invention based on the finding that when the ratio of the retardation of iodine to the retardation of polyvinyl alcohol is greater than or equal to 0.38 in a case where the orientation of iodine and the orientation of polyvinyl alcohol are both high, the iodine-polyvinyl alcohol complex is stabilized and resists red discoloration in a heat resistance test.

Figure 8:
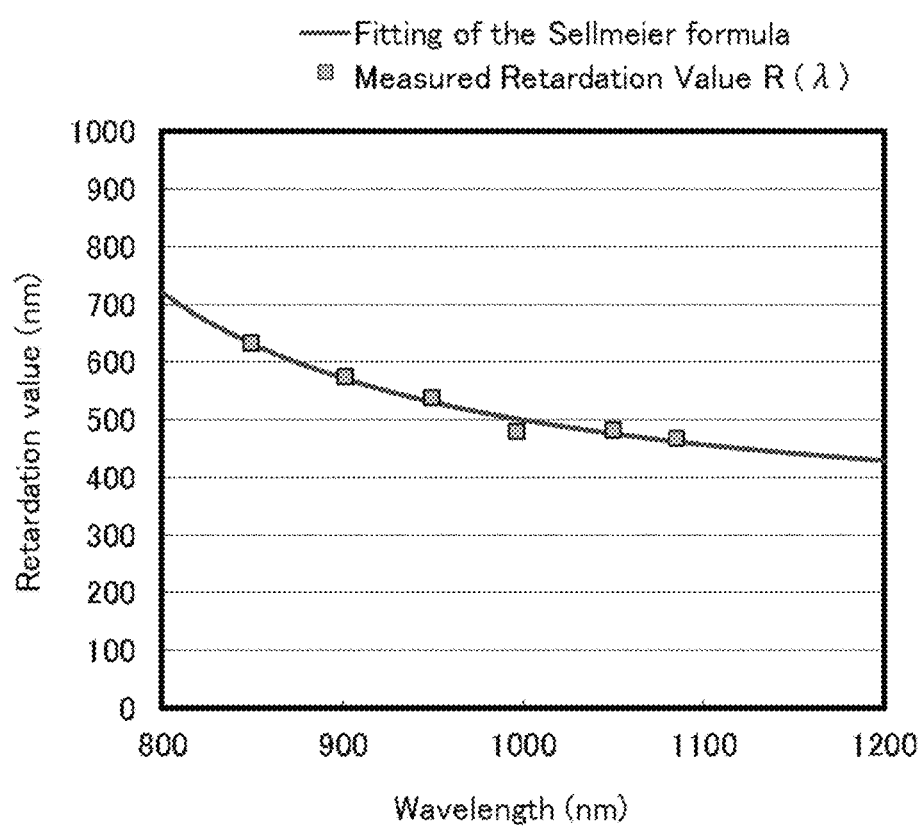
FIG. 8 is a plot showing the measured retardation values R(λ) of the retardation of polyvinyl alcohol and the retardation of iodine at two or more wavelengths greater than or equal to 850 nm plotted against the wavelengths (λ), the plot being subjected to fitting of the Sellmeier formula by at least squares method.

In this regard, the retardation (Rpva) of polyvinyl alcohol and the retardation (Ri) of iodine can be determined by the measurement of retardation values in a wavelength region with no absorption band of iodine. Specifically, retardation values are measured at two or more wavelengths greater than or equal to 850 nm, and the measured retardation values R(λ) are plotted against the wavelengths (λ), as shown in FIG. 8. The plots are subjected to fitting of the Sellmeier formula below by least squares method. In the formula, A and B are fitting parameters and are coefficients determined by least squares method.

$$R(\lambda)=A+B/(\lambda^2-600^2)$$

In this case, the retardation value R(λ) can be separated into the retardation (Rpva) of polyvinyl alcohol with no wavelength dependence and the retardation (Ri) of iodine with strong wavelength dependence as shown below.

$$Rpva=A$$

$$Ri=B/(\lambda^2-600^2)$$

The retardation of polyvinyl alcohol and the retardation of iodine at a wavelength λ of 1,000 nm can be calculated based on the separation formulae.

(3) Polarizing Properties of Polarizing Plate or Polarizer

The polarizing performance of the polarizing plate or the polarizer can be generally expressed by values called single transmittance and degree of polarization, and the single transmittance and the degree of polarization are defined by the following formulae, respectively.

$$\text{Single transmittance }(\lambda)=0.5\times(Tp(\lambda)+Tc(\lambda))$$

$$\text{Degree }(\lambda)\text{ of polarization}=100\times(Tp(\lambda)-Tc(\lambda))/(Tp(\lambda)+Tc(\lambda))$$

In the formulae, Tp(λ) is the transmittance (%) of the polarizing plate or the polarizer measured in a parallel Nicols relationship with the incident linearly-polarized light with a wavelength λ nm, and Tc(λ) is the transmittance (%) of the polarizing plate or the polarizer measured in a crossed Nicols relationship with the incident linearly-polarized light with a wavelength λ nm. Tp(λ) and Tc(λ) are measured values both obtained by polarized ultraviolet-visible absorption spectroscopy with a spectrophotometer. The values obtained by multiplying, by a sensitivity correction factor called a visibility correction factor, the single transmittance (λ) and the degree (λ) of polarization determined at each wavelength are called the visibility correction single transmittance (Ty) and the visibility correction degree (Py) of polarization, respectively. The Ty and Py values can be easily measured with, for example, an absorption photometer (Model No. V7100) manufactured by JASCO Corporation.

The polarizing plate or the polarizer according to the invention preferably has a visibility correction single transmittance (Ty) greater than or equal to 40.0% and a visibility correction degree (Py) of polarization greater than or equal to 99% in order to ensure high image clarity when the polarizing plate is used in a display such as a liquid crystal display.

(4) Polarizer

Polarizer 5 may include a uniaxially stretched polyvinyl alcohol-based resin layer and iodine adsorbed and oriented in the layer. In the invention, polarizer 5 has a thickness less than or equal to 10 μm, preferably less than or equal to 7 μm. Setting the thickness of polarizer 5 to less than or equal to 10 μm can make polarizing plate 1 or 2 thin, while red discoloration in a heat resistance test can be effectively suppressed according to the invention even when such polarizer 5 of thin film is used.

The polyvinyl alcohol-based resin used to form the polyvinyl alcohol-based resin layer may be a product obtained by saponifying a polyvinyl acetate-based resin. Examples of the polyvinyl acetate-based resin include polyvinyl acetate that is a homopolymer of vinyl acetate, and a copolymer of vinyl acetate and any other monomer polymerizable therewith. Examples of any other monomer polymerizable with vinyl acetate include unsaturated carboxylic acids, olefins, vinyl ethers, unsaturated sulfonic acids, and ammonium group-containing acrylamides.

The polyvinyl alcohol-based resin is subjected to film formation to form polarizer 5. The method for subjecting the polyvinyl alcohol-based resin to film formation is not particularly limited and may be a known method. In order to easily form polarizer 5 with a desired thickness, a solution of the polyvinyl alcohol-based resin is preferably applied onto a substrate film to form a film.

Polarizer 5 needs to have undergone stretching for orientation. Polarizer 5 preferably is stretched to a stretch ratio of more than 5, more preferably to a stretch ratio of more than 5 and less than or equal to 17.

The polyvinyl alcohol-based resin may have a saponification degree in the range of 80.0 to 100.0 mol %, preferably in the range of 90.0 to 99.5 mol %, more preferably in the range of 94.0 to 99.0 mol %. If the saponification degree is less than 80.0 mol %, resulting polarizing plate 1 or 2 may have reduced resistance to water and moist heat. If the polyvinyl alcohol-based resin used has a saponification degree greater than 99.5 mol %, the speed of dyeing the resin may be low so that the productivity may decrease and resulting polarizer 5 may fail to have sufficient polarizing performance.

The saponification degree is a unit ratio (mol %) representing a rate of conversion from acetic acid groups (acetoxy groups ($-OCOCH_3$)) in a polyvinyl acetate-based resin as a raw material for the polyvinyl alcohol-based resin into hydroxyl groups by a saponification process. This is defined by the following formula:

Saponification degree (mol %)=100×(the number of hydroxyl groups)/(the number of hydroxyl groups+the number of acetic acid groups)

The saponification degree can be determined according to JIS K 6726 (1994). The higher saponification degree indicates the higher hydroxyl group content and thus indicates the lower content of acetic acid groups capable of inhibiting crystallization.

The polyvinyl alcohol-based resin may be a modified polyvinyl alcohol obtained by partially modifying polyvinyl alcohol. Examples of the modified polyvinyl alcohol include those obtained by modifying polyvinyl alcohol-based resin with an olefin such as ethylene or propylene, an unsaturated carboxylic acid such as acrylic acid, methacrylic acid, or crotonic acid, an alkyl ester of an unsaturated carboxylic acid, or acrylamide. The modification rate is preferably less than 30 mol %, more preferably less than 10 mol %. If the modification is performed at a rate greater than 30 mol %, the modified product can resist adsorption of iodine so that resulting polarizer 5 may fail to have sufficient polarizing performance.

The polyvinyl alcohol-based resin preferably has an average polymerization degree of 100 to 10,000, more preferably 1,500 to 8,000, even more preferably 2,000 to 5,000. The average polymerization degree of the polyvinyl alcohol-based resin can be determined according to JIS K 6726 (1994).

Examples of commercially available products of the polyvinyl alcohol-based resin preferably used in the invention include PVA 124 (saponification degree: 98.0-99.0 mol %), PVA 117 (saponification degree: 98.0-99.0 mol %), PVA 624 (saponification degree: 95.0-96.0 mol %), and PVA 617 (saponification degree: 94.5-95.5 mol %) manufactured by KURARAY CO., LTD.; AH-26 (saponification degree: 97.0-98.8 mol %), AH-22 (saponification degree: 97.5-98.5 mol %), NH-18 (saponification degree: 98.0-99.0 mol %), and N-300 (saponification degree: 98.0-99.0 mol %) manufactured by The Nippon Synthetic Chemical Industry Co., Ltd.; and JC-33 (saponification degree: greater than or equal to 99.0 mol %), JM-33 (saponification degree: 93.5-95.5 mol %), JM-26 (saponification degree: 95.5-97.5 mol %), JP-45 (saponification degree: 86.5-89.5 mol %), JF-17 (saponification degree: 98.0-99.0 mol %), JF-17L (saponification degree: 98.0-99.0 mol %), and JF-20 (saponification degree: 98.0-99.0 mol %) manufactured by JAPAN VAM & POVAL CO., LTD., all of them are trade names.

(5) First and Second Protective Films

First and second protective films 10 and 20 are each a transparent resin film including a thermoplastic resin, such as a polyolefin-based resin such as an acyclic polyolefin-based resin (such as a polypropylene-based resin) or a cyclic polyolefin-based resin (such as a norbornene-based resin); a cellulose ester-based resin such as cellulose triacetate or cellulose diacetate; a polyester-based resin such as polyethylene terephthalate, polyethylene naphthalate, or polybutylene terephthalate; a polycarbonate-based resin; a (meth) acrylic resin; or any mixture or copolymer thereof. First and second protective films 10 and 20 may be of the same or different types.

Cyclic polyolefin-based resin is a generic name for resins obtained by polymerization of cyclic olefins as polymerization units, such as resins disclosed in Japanese Patent Laying-Open Nos. H01-240517, H03-14882, and H03-122137.

Specific examples of the cyclic polyolefin-based resin include ring-opened (co)polymers of cyclic olefins, addition polymers of cyclic olefins, copolymers (typically random copolymers) of cyclic olefins and chain olefins such as ethylene and propylene, graft polymers obtained by modifying these polymers with an unsaturated carboxylic acid or a derivative thereof, and hydrides thereof. In particular, norbornene-based resins produced using a norbornene monomer, such as norbornene or a polycyclic norbornene monomer, as the cyclic olefin are preferably used.

Various products of cyclic polyolefin-based resin are commercially available. Examples of commercially available products of cyclic polyolefin-based resin include Topas (manufactured by Topas Advanced Polymers GmbH and available from Polyplastics Co., Ltd.), ARTON (manufactured by JSR Corporation), ZEONOR (manufactured by Zeon Corporation), ZEONEX (manufactured by Zeon Corporation), and APEL (manufactured by Mitsui Chemicals, Inc.), all of them are trade names.

The protective film may also be a commercially available product produced by forming cyclic polyolefin-based resin into a film, such as Escena (manufactured by SEKISUI CHEMICAL CO., LTD.), SCA40 (manufactured by SEKISUI CHEMICAL CO., LTD.), and ZEONOR Film (manufactured by Zeon Corporation), all of them are trade names.

The cellulose ester-based resin is an ester of cellulose and a fatty acid. Specific examples of the cellulose ester-based resin include cellulose triacetate, cellulose diacetate, cellulose tripropionate, and cellulose dipropionate. Copolymers of these resins or resins obtained by partially modifying the hydroxyl groups of these resins with other substituents may also be used. Among them, cellulose triacetate (triacetylcellulose (TAC)) is particularly preferred. There are many commercially available products of cellulose triacetate, and the products are also advantageous in terms of easy availability and cost. Examples of commercially available products of cellulose triacetate include FUJITAC TD80 (manufactured by FUJIFILM Corporation), FUJITAC TD80UF (manufactured by FUJIFILM Corporation), FUJITAC TD80UZ (manufactured by FUJIFILM Corporation), FUJITAC TD40UZ (manufactured by FUJIFILM Corporation), KC8UX2M (manufactured by Konica Minolta Opto Co., Ltd.), and KC4UY (manufactured by Konica Minolta Opto Co., Ltd.).

First protective film 10 and/or second productive film 20 may be a protective film capable of also having an optical function such as a retardation film or a brightness enhancement film. For example, the transparent resin film made of the above material may be stretched (uniaxially or biaxially stretched) or coated with a liquid crystal layer to form a retardation film with a desired retardation value.

A surface treatment layer (coating layer) such as a hard coat layer, an antiglare layer, an antireflection layer, an antistatic layer, or an antifouling layer may also be formed on the surface of first protective film 10 and/or second protective film 20 opposite to polarizer 5. The method used to form the surface treatment layer on the protective film surface is not particularly limited and may be a known method.

The thickness of first and second protective films 10 and 20 is preferably as thin as possible for the reduction of the thickness of polarizing plates 1 and 2. However, if first and second protective films 10 and 20 are too thin, they will have reduced strength and poor workability. Therefore, first and second protective films 10 and 20 preferably have a thickness of 5 to less than or equal to 90 μm, more preferably 5 to 60 μm, even more preferably 5 to 50 μm.

(6) First and Second Adhesive Layers

The adhesive used to form first and second adhesive layers 15 and 25 may be a water-based adhesive or a photo-curable adhesive. The adhesive used to form first adhesive layer 15 and the adhesive used to form second adhesive layer 25 may be of the same or different types.

The water-based adhesive may be a two-component, aqueous polyurethane emulsion adhesive or an adhesive including a polyvinyl alcohol-based resin aqueous solution. In particular, a water-based adhesive including a polyvinyl alcohol-based resin aqueous solution is preferably used.

The polyvinyl alcohol-based resin may be a vinyl alcohol homopolymer obtained by saponifying polyvinyl acetate that is a homopolymer of vinyl acetate; a polyvinyl alcohol copolymer obtained by saponifying a copolymer of vinyl acetate and any other monomer copolymerizable therewith; or a modified polyvinyl alcohol-based polymer obtained by partially modifying the hydroxyl groups of these polymers. The water-based adhesive may contain an additive such as a polyvalent aldehyde, a water-soluble epoxy compound, a melamine compound, a zirconia compound, or a zinc compound. When the water-based adhesive is used, the adhesive layer made from the adhesive generally has a thickness less than or equal to 1 μm.

The method for bonding polarizer 5 and the protective film together with the water-based adhesive is not particularly limited and may be a method that includes uniformly applying or casting the water-based adhesive onto a bonding surface of one film, placing the other film on the coated surface, bonding the films by means of a roller or the like, and drying the resulting laminate. After prepared, the water-based adhesive is generally applied at a temperature of 15 to 40° C. and bonded at a temperature generally in the range of 15 to 30° C.

When the water-based adhesive is used, the step of drying the bonded films is preferably performed to remove water from the water-based adhesive after the bonding. The drying may be performed, for example, by introducing the laminated film into a drying furnace. The drying temperature (the temperature of the drying furnace) is preferably 30 to 90° C. If it is lower than 30° C., the protective film tends to easily separate from polarizer 5. If the drying temperature exceeds 90° C., the polarizing performance of polarizer 5 may be degraded by heat. The drying time may be about 10 to about 1,000 seconds.

The drying step may be followed by the step of aging at room temperature or a temperature slightly higher than room temperature, such as a temperature of about 20 to about 45° C., for about 12 to about 600 hours. The aging temperature is generally set lower than the drying temperature.

The term "photo-curable adhesive" refers to an adhesive capable of being cured by exposure to active energy rays such as ultraviolet rays, examples of which may include an adhesive containing a polymerizable compound and a photopolymerization initiator, an adhesive containing a photoreactive resin, and an adhesive containing a binder resin and a photoreactive cross-linking agent. Examples of the polymerizable compound include a photo-curable monomer such as a photo-curable epoxy monomer, a photo-curable acrylic monomer, or a photo-curable urethane monomer, and an oligomer derived from a photo-polymerizable monomer. Examples of the photopolymerization initiator may include materials capable of producing active species such as neutral, anion, or cation radicals upon exposure to active energy rays such as ultraviolet rays. A photo-curable adhesive containing a photo-curable epoxy monomer and a photo-cationic polymerization initiator is preferably used as the photo-curable adhesive containing a polymerizable compound and a photopolymerization initiator.

The method for bonding polarizer 5 and the protective film together with the photo-curable adhesive is, for example, but not particularly limited to, a method that includes applying the photo-curable adhesive to a bonding surface of one film by casting, Meyer bar coating, gravure coating, comma coater method, doctor blade method, die coating, dip coating, spray coating, or other coating methods, then placing polarizer 5 and the protective film on each other, and allowing them to pass between nip rolls or other means to bond them. Casting is a method in which while a film to be coated is moved in a substantially vertical direction, a substantially horizontal direction, or an oblique direction between them, the adhesive is poured and spread on the bonding surface. After the bonding with nip rolls or other means, the adhesive layer preferably has a thickness greater than or equal to 0.01 μm and less than or equal to 5 μm before the adhesive layer is dried or cured.

When the photo-curable adhesive is used, the bonding described above is optionally followed by a drying step (for example, in a case where the photo-curable adhesive contains a solvent), and then a curing step is performed in which the photo-curable adhesive is cured by exposure to active energy rays. The light source for the active energy rays is preferably, but not particularly limited to, an active energy ray source having an emission distribution at a wavelength less than or equal to 400 nm. Specifically, a low-pressure mercury lamp, a medium-pressure mercury lamp, a high-pressure mercury lamp, an ultrahigh-pressure mercury lamp, a chemical lamp, a black light lamp, a microwave-excited mercury lamp, or a metal halide lamp is preferably used.

The intensity of irradiation of the photo-curable adhesive is determined, as appropriate, depending on the composition of the photo-curable adhesive. The irradiation intensity is preferably selected so as to be 0.1 to 6,000 mW/cm$^2$ in the wavelength region effective for the activation of the polymerization initiator. When the irradiation intensity is greater than or equal to 0.1 mW/cm$^2$, the reaction time will be not too long, and when it is less than or equal to 6,000 mW/cm$^2$, heat radiated from the light source and generation of heat during the curing of the photo-curable adhesive will be less likely to cause yellowing of the photo-curable adhesive or degradation of the polarizer.

The time of irradiation of the photo-curable adhesive is also determined, as appropriate, depending on the composition of the photo-curable adhesive. Preferably, the irradiation time is so selected that the integrated light amount expressed as the product of the irradiation intensity and the irradiation time is 10 to 10,000 mJ/cm$^2$. When the integrated light amount is greater than or equal to 10 mJ/cm$^2$, a sufficient amount of active species can be produced from the polymerization initiator so that the curing reaction can be allowed to proceed more reliably. When it is less than or equal to 10,000 mJ/cm$^2$, the irradiation time will be not too long so that good productivity can be maintained.

In this regard, after the exposure to the active energy rays, the adhesive layer generally has a thickness of about 0.001 to about 5 μm, preferably 0.01 to 2 μm, more preferably 0.01 to 1 μm.

(7) Pressure-Sensitive Adhesive Layer

A pressure-sensitive adhesive layer for bonding the polarizing plate to any other member (such as a liquid crystal cell for use in a liquid crystal display) may also be disposed on first or second protective film 10 or 20 in polarizing plate 1 shown in FIG. 1 or on polarizer 5 in single side protective film-bearing polarizing plate 2 shown in FIG. 2. The pressure-sensitive adhesive used to form the pressure-sensitive adhesive layer generally includes a pressure-sensitive adhesive composition produced by adding a cross-linking agent such as an isocyanate compound, an epoxy compound, or an aziridine compound to a (meth)acrylic resin, a styrene-based resin, a silicone-based resin, or any other base polymer. The pressure-sensitive adhesive layer may further contain fine particles to have light-scattering properties.

Although the pressure-sensitive adhesive layer may have a thickness of 1 to 40 μm, it is preferably applied as thin as possible as long as its properties such as workability and durability are not impaired. Specifically, the pressure-sensitive adhesive layer preferably has a thickness of 3 to 25 μm. The thickness of 3 to 25 μm is also preferred in order to provide good workability and control dimensional changes of polarizer 5. The pressure-sensitive adhesive layer with a thickness less than 1 μm may have reduced tackiness, and the pressure-sensitive adhesive layer with a thickness greater than 40 μm may easily cause a defect such as oozing of the pressure-sensitive adhesive.

The method for forming the pressure-sensitive adhesive layer is not particularly limited. The pressure-sensitive adhesive layer may be formed by applying a pressure-sensitive adhesive composition (pressure-sensitive adhesive solution) to the surface of the protective film or the polarizer, wherein the composition includes the respective components including the base polymer mentioned above, and drying the composition. Alternatively, the pressure-sensitive adhesive layer may be formed on a separator (release film) and then transferred onto the surface of the protective film or the polarizing film. If necessary, a surface treatment such as a corona treatment may be performed on at least one of the surface of the protective film or the polarizer and the surface of the pressure-sensitive adhesive layer in the process of forming the pressure-sensitive adhesive layer on the surface of the protective film or the polarizer.

The polarizing plate may further include an additional optical layer disposed on the protective film or the polarizer. The additional optical layer may be, for example, a reflective polarizing film capable of transmitting a certain type of polarized light and reflecting polarized light of a type reverse thereto; a film with an antiglare function having irregularities on its surface; a film with a surface reflection-preventing function; a reflective film having a surface reflecting function; a translucent reflective film having both reflecting and transmitting functions; or a viewing angle compensation film.

Examples of a commercially available product corresponding to the reflective polarizing film capable of transmitting a certain type of polarized light and reflecting polarized light of a type reverse thereto include DBEF (manufactured by 3M Company and available from Sumitomo 3M Limited in Japan) and APF (manufactured by 3M Company and available from Sumitomo 3M Limited in Japan).

Examples of the viewing angle compensation film include an optical compensation film having a liquid crystalline compound applied, oriented, and fixed onto the surface of a substrate, a retardation film including a polycarbonate-based resin, and a retardation film including a cyclic polyolefin-based resin.

Examples of a commercially available product corresponding to the optical compensation film having a liquid crystalline compound applied, oriented, and fixed onto the surface of a substrate include WV Film (manufactured by FUJIFILM Corporation), NH Film (manufactured by JX Nippon Oil & Energy Corporation), and NR Film (manufactured by JX Nippon Oil & Energy Corporation).

Examples of a commercially available product corresponding to the retardation film including a cyclic polyolefin-based resin include ARTON Film (manufactured by JSR Corporation), Escena (manufactured by SEKISUI CHEMICAL CO., LTD.), and ZEONOR Film (manufactured by Zeon Corporation).

<Method of Producing Polarizer and Polarizing Plate>

Figure 3:
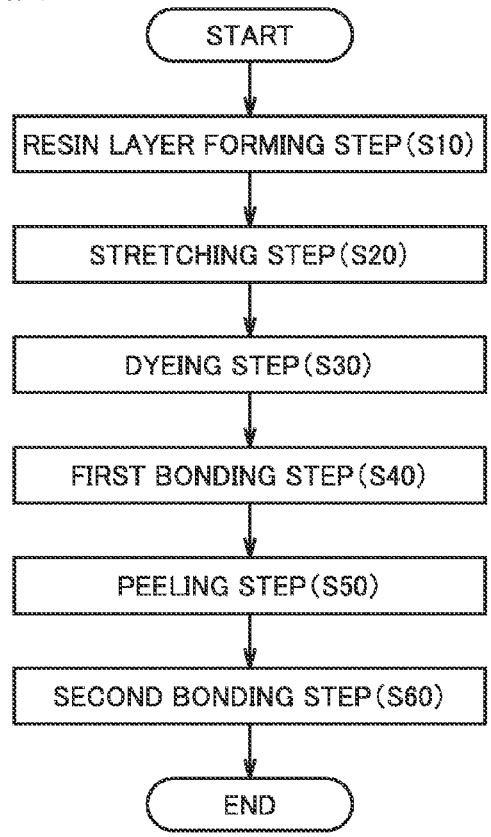
FIG. 3 is a flow chart showing a preferred example of a method for producing a polarizing plate according to the invention.

The polarizer and the polarizing plate of the invention are preferably produced by the method shown in FIG. 3. The method for producing the polarizing plate shown in FIG. 3 includes, in order, the following steps:

(1) a resin layer forming step S10 that includes applying a polyvinyl alcohol-based resin-containing coating liquid to at least one surface of a substrate film and then drying the coating to form a polyvinyl alcohol-based resin layer, so that a laminated film is obtained;

(2) a stretching step S20 that includes stretching the laminated film to obtain a stretched film;

(3) a dyeing step S30 that includes dyeing the polyvinyl alcohol-based resin layer of the stretched film with iodine to form a polarizer, so that a polarizing laminated film is obtained;

(4) a first bonding step S40 that includes bonding a first protective film onto the polarizer of the polarizing laminated film to obtain a laminate film; and (5) a peeling step S50 that includes peeling off the substrate film from the laminate film to obtain a single side protective film-bearing polarizing plate.

When a double side protective films-bearing polarizing plate 1 shown in FIG. 1 is produced, the method further includes, after peeling step S50, (6) a second bonding step S60 that includes bonding a second protective film to the surface of the polarizer of the single side protective film-bearing polarizing plate.

Hereinafter, each step will be described with reference to FIGS. 4 to 7.

(1) Resin Layer Forming Step S10

Figure 4:
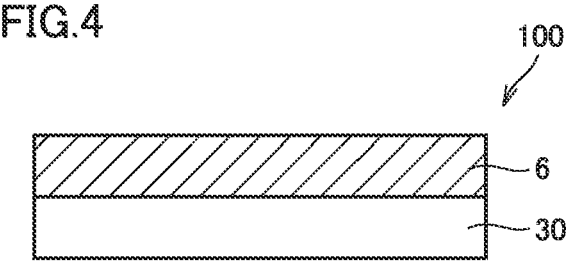
FIG. 4 is a schematic cross-sectional view showing an example of a layered structure of a laminated film obtained in a resin layer forming step.

Referring to FIG. 4, this step includes forming a polyvinyl alcohol-based resin layer 6 on at least one surface of a substrate film 30 to obtain a laminated film 100. Polyvinyl alcohol-based resin layer 6 is to be turned into a polarizer 5 through stretching step S20 and dyeing step S30. Polyvinyl alcohol-based resin layer 6 can be formed by applying a polyvinyl alcohol-based resin-containing coating liquid to one or both surfaces of substrate film 30 and drying the coating layer. Such a method of forming the polyvinyl alcohol-based resin layer by coating is advantageous in that it can easily form polarizer 5 of thin film.

[Substrate Film]

Substrate film 30 may include a thermoplastic resin. In particular, substrate film 30 preferably includes a thermoplastic resin with a high level of transparency, mechanical strength, thermal stability, stretchability, and other properties. Specific examples of such a thermoplastic resin include a polyolefin-based resin such as an acyclic polyolefin-based resin or a cyclic polyolefin-based resin (such as a norbornene-based resin), a polyester-based resin, a (meth) acrylic resin, a cellulose ester-based resin such as cellulose triacetate or cellulose diacetate, a polycarbonate-based resin, a polyvinyl alcohol-based resin, a polyvinyl acetate-based resin, a polyarylate-based resin, a polystyrene-based resin, a polyethersulfone-based resin, a polysulfone-based resin, a polyamide-based resin, a polyimide-based resin, and mixtures or copolymers thereof.

Substrate film 30 may be a monolayer structure including a single resin layer of one or more thermoplastic resins or may be a multilayer structure including a stack of two or more resin layers each including one or more thermoplastic resins. Substrate film 30 preferably includes a resin capable of being stretched at a temperature suitable for the stretching of polyvinyl alcohol-based resin layer 6 at the stretching of laminated film 100 in stretching step S20 as described below.

The acyclic polyolefin-based resin may be a homopolymer of a acyclic olefin, such as a polyethylene resin or a polypropylene resin, or a copolymer of two or more acyclic olefins. Substrate film 30 including the acyclic polyolefin-based resin is preferable in that it can be stably stretched to a high ratio. In particular, substrate film 30 more preferably includes a polypropylene-based resin (a polypropylene resin as a homopolymer of propylene or a propylene-based copolymer) or a polyethylene-based resin (a polyethylene resin as a homopolymer of ethylene or an ethylene-based copolymer).

The propylene-based copolymer, as an example of the thermoplastic resin preferably used to form substrate film 30, is a copolymer of propylene and any other monomer polymerizable therewith.

Examples of any other monomer polymerizable with propylene include ethylene and an α-olefin. The α-olefin is preferably an α-olefin having greater than or equal to 4 carbon atoms, more preferably an α-olefin having 4 to 10 carbon atoms. Specific examples of the α-olefin having 4 to 10 carbon atoms include linear monoolefins such as 1-butene, 1-pentene, 1-hexene, 1-heptene, 1-octene, and 1-decene; branched monoolefins such as 3-methyl-1-butene, 3-methyl-1-pentene, and 4-methyl-1-pentene; and vinylcyclohexane. The copolymer of propylene and any other monomer copolymerizable therewith may be a random copolymer or a block copolymer.

The content of any other monomer in the copolymer is 0.1 to 20% by weight, preferably 0.5 to 10% by weight. The content of any other monomer in the copolymer can be determined by performing infrared (IR) spectroscopy according to the method described on page 616 of Kobunshi Bunseki Handbook (Polymer Analysis Handbook), 1995, published by KINOKUNIYA COMPANY LTD.

Among the above, a homopolymer of propylene, a propylene-ethylene random copolymer, a propylene-1-butene random copolymer, or a propylene-ethylene-1-butene random copolymer is preferably used as the polypropylene-based resin.

The polypropylene-based resin preferably has substantially isotactic or syndiotactic stereoregularity. When including the polypropylene-based resin having substantially isotactic or syndiotactic stereoregularity, substrate film 30 has relatively high handleability and high mechanical strength under a high-temperature environment.

The polyester-based resin is a resin having ester bonds, and generally includes a polycondensate of a polyvalent carboxylic acid or a derivative thereof and a polyhydric alcohol. The polyvalent carboxylic acid or the derivative thereof may be a dicarboxylic acid or a derivative thereof, examples of which include terephthalic acid, isophthalic acid, dimethyl terephthalate, and dimethyl naphthalenedicarboxylate. The polyhydric alcohol may be a diol (dihydric alcohol), examples of which include ethylene glycol, propanediol, butanediol, neopentyl glycol, and cyclohexanedimethanol.

A typical example of the polyester-based resin includes polyethylene terephthalate, which is a polycondensate of terephthalic acid and ethylene glycol. Although polyethylene terephthalate is a crystalline resin, it may be used before undergoing crystallization so that it can easily undergo stretching and other processes. If necessary, polyethylene terephthalate may undergo crystallization during stretching or other processes such as a heat treatment after stretching.

A copolymerized polyester is also preferably used. Such a copolymerized polyester is obtained by copolymerizing an additional different monomer into the skeleton of polyethylene terephthalate so that the crystallinity is reduced (or the polymer is made amorphous). Examples of such a resin include resins obtained by copolymerization with cyclohexanedimethanol or isophthalic acid. These resins are also preferably used because of their high stretchability.

Specific examples of the polyester-based resin other than polyethylene terephthalate and copolymers thereof include polybutylene terephthalate, polyethylene naphthalate, polybutylene naphthalate, polytrimethylene terephthalate, polytrimethylene naphthalate, polycyclohexane dimethyl terephthalate, polycyclohexane dimethyl naphthalate, and mixtures and copolymers thereof.

The (meth)acrylic resin is a resin including a (meth) acryloyl group-containing compound as a main monomer component. Specific examples of the (meth)acrylic resin include poly(meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and copolymers of methyl methacrylate and an alicyclic hydrocarbon group-containing compound (such as methyl methacrylate-cyclohexyl methacrylate copolymers and methyl methacrylate-norbornyl (meth)acrylate copolymers). A polymer composed mainly of poly($C_{1-6}$ alkyl (meth)acrylate) such as polymethyl (meth)acrylate is preferably used, and a methyl methacrylate-based resin mainly composed of methyl methacrylate (50 to 100% by weight, preferably 70 to 100% by weight) is more preferably used.

The polycarbonate-based resin is an engineering plastic including a polymer in which monomer units are linked by carbonate groups, and is a resin having a high level of impact resistance, heat resistance, flame retardancy, and transparency. The polycarbonate-based resin used to form substrate film 30 may also be, for example, a resin, called modified polycarbonate, having a modified polymer skeleton for a reduction in photoelastic coefficient, or a copolymerized polycarbonate with improved wavelength dependence.

There are various commercially available products of the polycarbonate-based resin. Examples of commercially available products of the polycarbonate-based resin include Panlite (manufactured by TEIJIN LIMITED), Iupilon (manufactured by Mitsubishi Engineering-Plastics Corporation), SD POLYCA (manufactured by Sumitomo Dow Limited), and CALIBRE (manufactured by The Dow Chemical Company), all of them are trade names.

Among the above, the polypropylene-based resin is preferably used in view of stretchability and heat resistance.

The description of the protective film is quoted herein with respect to the cyclic polyolefin-based resin and the cellulose ester-based resin that may be used for substrate film 30. The acyclic polyolefin-based resin, the polyester-based resin, the (meth)acrylic resin, or the polycarbonate-based resin described above for substrate film 30 may also be used to form the protective film.

Substrate film 30 may also contain any appropriate additive in addition to the thermoplastic resin. Examples of such an additive include an ultraviolet absorber, an antioxidant, a lubricant, a plasticizer, a release agent, a discoloration preventing agent, a flame retardant, a nucleating agent, an antistatic agent, a pigment, and a colorant. The content of the thermoplastic resin in substrate film 30 is preferably 50 to 100% by weight, more preferably 50 to 99% by weight, even more preferably 60 to 98% by weight, further more preferably 70 to 97% by weight. If the content of the thermoplastic resin in substrate film 30 is less than 50% by weight, high transparency and other properties inherent in the thermoplastic resin may be insufficiently exhibited.

The thickness of substrate film 30 may be determined as appropriate. Generally, in view of strength and workability such as handleability, the thickness of substrate film 30 is preferably 1 to 500 μm, more preferably 1 to 300 μm, even more preferably 5 to 200 μm, most preferably 5 to 150 μm.

[Polyvinyl Alcohol-Based Resin-Containing Coating Liquid]

The coating liquid is preferably a polyvinyl alcohol-based resin solution obtained by dissolving a polyvinyl alcohol-based resin power in a good solvent (e.g., water). The polyvinyl alcohol-based resin has been described above in detail.

If necessary, the coating liquid may contain an additive such as a plasticizer or a surfactant. The plasticizer may be a polyol or a condensate thereof, examples of which include glycerol, diglycerol, triglycerol, ethylene glycol, propylene glycol, and polyethylene glycol. The additive is preferably added in an amount less than or equal to 20% by weight of the polyvinyl alcohol-based resin.

[Application of Coating Liquid and Drying of Coating Layer]

The method for applying the coating liquid to substrate film 30 may be appropriately selected from wire bar coating, roll coating such as reverse coating or gravure coating, die coating, comma coating, lip coating, spin coating, screen coating, fountain coating, dipping, spraying, and other methods.

The coating liquid may be applied to both surfaces of substrate film 30. In this case, the coating liquid may be applied to one surface and then the other surface using any of the above methods, or may be applied simultaneously to both surfaces of substrate film 30 using dipping, spray coating, or any other special device.

The temperature and time for drying the coating layer (the polyvinyl alcohol-based resin layer before drying) are selected depending on the type of the solvent in the coating liquid. The drying temperature is, for example, 50 to 200° C., preferably 60 to 150° C. When the solvent includes water, the drying temperature is preferably higher than or equal to 80° C. The drying time is, for example, 2 to 20 minutes.

Polyvinyl alcohol-based resin layer 6 may be formed on only one or both of the two surfaces of substrate film 30. When polyvinyl alcohol-based resin layers 6 are formed on both surfaces, curling of the film can be suppressed that would occur during the production of polarizing laminated film 300 (see FIG. 6), and two polarizing plates can be obtained from a single piece of polarizing laminated film 300. This is also advantageous for the polarizing plate production efficiency.

In laminated film 100, polyvinyl alcohol-based resin layer 6 preferably has a thickness of 3 to 30 more preferably 5 to 20 When polyvinyl alcohol-based resin layer 6 has a thickness in this range, polarizer 5 that is well dyed with iodine, has high polarizing performance, and has a sufficiently small thickness less than or equal to 10 μm can be obtained through stretching step S20 and dyeing step S30 described below. If polyvinyl alcohol-based resin layer 6 has a thickness greater than 30 μm, polarizer 5 can have a thickness greater than 10 μm. If polyvinyl alcohol-based resin layer 6 has a thickness less than 3 μm, the stretched product can be too thin and tend to have poor dyeability.

Before the coating liquid is applied, the surface of substrate film 30 on which at least polyvinyl alcohol-based resin layer 6 is to be formed may be subjected to a corona treatment, a plasma treatment, a flame treatment, or other treatments for improving the adhesion between substrate film 30 and polyvinyl alcohol-based resin layer 6.

Before the coating liquid is applied, a primer layer or an adhesive layer may also be formed on substrate film 30 so that the adhesion can be improved between substrate film 30 and polyvinyl alcohol-based resin layer 6, polyvinyl alcohol-based resin layer 6 being formed on substrate film 30 with the primer or adhesive layer interposed therebetween.

[Primer Layer]

The primer layer can be formed by applying a primer layer-forming coating liquid to the surface of substrate film 30 and then drying the coating. The primer layer-forming coating liquid contains a component capable of providing relatively strong adhesion to both substrate film 30 and polyvinyl alcohol-based resin layer 6. The primer layer-forming coating liquid generally contains a resin component capable of providing such adhesion and a solvent. The resin component is preferably a thermoplastic resin with a high level of transparency, thermal stability, and stretchability, such as a (meth)acrylic resin or a polyvinyl alcohol-based resin. In particular, a polyvinyl alcohol-based resin is preferably used that provides good adhesion.

Examples of the polyvinyl alcohol-based resin include polyvinyl alcohol resin and derivatives thereof. Examples of derivatives of polyvinyl alcohol resin include polyvinyl formal, polyvinyl acetal, and other derivatives obtained by modifying polyvinyl alcohol resin with olefins such as ethylene and propylene; derivatives obtained by modifying polyvinyl alcohol resin with unsaturated carboxylic acids such as acrylic acid, methacrylic acid, and crotonic acid; derivatives obtained by modifying polyvinyl alcohol resin with an alkyl ester of an unsaturated carboxylic acid; and derivatives obtained by modifying polyvinyl alcohol resin with acrylamide. Among the examples of the polyvinyl alcohol-based resin, polyvinyl alcohol resin is preferably used.

The solvent to be used is generally a common organic or aqueous solvent capable of dissolving the resin component. Examples of the solvent include aromatic hydrocarbons such as benzene, toluene, and xylene; ketones such acetone, methyl ethyl ketone, and methyl isobutyl ketone; esters such as ethyl acetate and isobutyl acetate; chlorinated hydrocarbons such as methylene chloride, trichloroethylene, and chloroform; and alcohols such as ethanol, 1-propanol, 2-propanol, and 1-butanol. It should be noted that an organic solvent in the primer layer-forming coating liquid may dissolve substrate film 30 in the process of forming the primer layer with the coating liquid. Therefore, the solvent should preferably be selected, also taking into account the solubility of substrate film 30. In view of environmental impact, the primer layer is preferably formed using a coating liquid containing water as a solvent.

In order to increase the strength of the primer layer, a cross-linking agent may be added to the primer layer-forming coating liquid. The cross-linking agent may be any appropriate one selected from organic, inorganic, and other known cross-linking agents, depending on the type of the thermoplastic resin used. The cross-linking agent may be, for example, an epoxy cross-linking agent, an isocyanate cross-linking agent, a dialdehyde cross-linking agent, or a metal-based cross-linking agent.

The epoxy cross-linking agent may be any of a one-component curing type and a two-component curing type. Examples thereof include ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline, and diglycidyl amine.

Examples of the isocyanate cross-linking agent include tolylene diisocyanate, hydrogenated tolylene diisocyanate, trimethylolpropane-tolylene diisocyanate adducts, triphenylmethane triisocyanate, methylenebis(4-phenylmethane) triisocyanate, isophorone diisocyanate, and ketoxime- or phenol-blocked products thereof.

Examples of the dialdehyde cross-linking agent include glyoxal, malondialdehyde, succindialdehyde, glutardialdehyde, maleindialdehyde, and phthaldialdehyde.

Examples of the metal-based cross-linking agent include metal salts, metal oxides, metal hydroxides, and organometallic compounds. Examples of metal salts, metal oxides, and metal hydroxides include salts, oxides, and hydroxides of di- or polyvalent metals such as magnesium, calcium, aluminum, iron, nickel, zirconium, titanium, silicon, boron, zinc, copper, vanadium, chromium, and tin.

The organometallic compound is a compound having at least one intramolecular structure in which an organic group is bonded directly to a metal atom or bonded to a metal atom with an oxygen atom, a nitrogen atom, or any other atom interposed therebetween. The organic group means a monovalent or polyvalent group containing at least a carbon element, such as an alkyl group, an alkoxy group, or an acyl group. The term "bond" is intended to include not only covalent bonding but also coordinate bonding such as that in chelate compounds.

Preferred examples of the organometallic compound include organotitanium compounds, organozirconium compounds, organoaluminum compounds, and organosilicon compounds. One organometallic compound may be used alone, or two or more organometallic compounds may be used in combination.

Examples of organotitanium compounds include titanium orthoesters such as tetra-n-butyl titanate, tetraisopropyl titanate, butyl titanate dimer, tetra(2-ethylhexyl) titanate, and tetramethyl titanate; titanium chelates such as titanium acetylacetonate, titanium tetraacetylacetonate, polytitanium acetylacetonate, titanium octyleneglycolate, titanium lactate, titanium triethanolaminate, and titanium ethylacetoacetate; and titanium acylates such as polyhydroxytitanium stearate.

Examples of organozirconium compounds include zirconium n-propionate, zirconium n-butyrate, zirconium tetraacetylacetonate, zirconium monoacetylacetonate, zirconium bisacetylacetonate, and zirconium acetylacetonate bisethylacetoacetate.

Examples of organoaluminum compounds include aluminum acetylacetonate and aluminum organic acid chelates. Examples of organosilicon compounds include compounds in which the ligands listed above for the organotitanium compounds and the organozirconium compounds are bonded to silicon.

Besides the low-molecular-weight cross-linking agents shown above, a polymer cross-linking agent may also be used, such as a methylolated melamine resin or a polyamide epoxy resin. Examples of commercially available products of the polyamide epoxy resin include Sumirez Resin 650 (30) and Sumirez Resin 675 (all trade names) available from Taoka Chemical Co., Ltd.

When a polyvinyl alcohol-based resin is used as a resin component to form the primer layer, a polyamide epoxy resin, a methylolated melamine resin, a dialdehyde crosslinking agent, or a metal chelate compound cross-linking agent is preferably used as the cross-linking agent.

The contents of the resin component and the cross-linking agent in the primer layer-forming coating liquid may be as follows. Based on 100 parts by weight of the resin component, the amount of the cross-linking agent may be appropriately determined, depending on the type of the resin component or the cross-linking agent, in the range of about 0.1 to about 100 parts by weight, preferably in the range of about 0.1 to about 50 parts by weight. The primer layer-forming coating liquid is preferably prepared so as to have a solid concentration of about 1 to about 25% by weight.

The primer layer preferably has a thickness of about 0.05 to about 1 μm, more preferably 0.1 to 0.4 μm. The primer layer with a thickness less than 0.05 μm will be less effective in improving the adhesion between substrate film 30 and polyvinyl alcohol-based resin layer 6. The primer layer with a thickness greater than 1 μm is disadvantageous for the reduction of the thickness of the polarizing plate.

The primer layer-forming coating liquid may be applied to substrate film 30 by the same method as for the polyvinyl alcohol-based resin layer-forming coating liquid. The primer layer is applied to the surface to which the polyvinyl alcohol-based resin layer-forming coating liquid is to be applied (one or both surfaces of substrate film 30). The temperature and time for drying the coating layer of the primer layer-forming coating liquid are selected depending on the type of the solvent in the coating liquid. The drying temperature is, for example, 50 to 200° C., preferably 60 to 150° C. When the solvent contains water, the drying temperature is preferably higher than or equal to 80° C. The drying time is, for example, 30 seconds to 20 minutes.

When the primer layer is provided, the steps of forming coatings on substrate film 30 may be performed in any order. For example, the process of forming polyvinyl alcohol-based resin layers 6 on both surfaces of substrate film 30 may include forming the primer layers on both surfaces of substrate film 30 and then forming polyvinyl alcohol-based resin layers 6 on both sides. Alternatively, the primer layer and polyvinyl alcohol-based resin layer 6 may be sequentially formed on one surface of substrate film 30, and then the primer layer and polyvinyl alcohol-based resin layer 6 may be sequentially formed on the other surface of substrate film 30.

(2) Stretching Step S20

Figure 5:
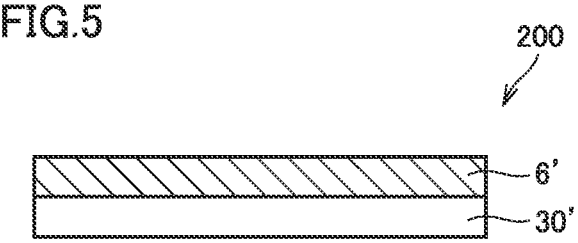
FIG. 5 is a schematic cross-sectional view showing an example of a layered structure of a stretched film obtained in a stretching step.

Referring to FIG. 5, this step includes stretching laminated film 100 including substrate film 30 and polyvinyl alcohol-based resin layer 6 to obtain a stretched film 200 including a stretched substrate film 30' and a stretched polyvinyl alcohol-based resin layer 6'. The stretching is generally uniaxial stretching.

The stretch ratio to which laminated film 100 is stretched may be selected, as appropriate, depending on the desired polarizing properties. The stretch ratio is preferably from more than 5 to less than or equal to 17, more preferably from more than 5 to less than or equal to 8, relative to the original length of laminated film 100. If the stretch ratio is less than or equal to 5, polyvinyl alcohol-based resin layer 6 may fail to be sufficiently oriented so that polarizer 5 may fail to have a sufficiently high degree of polarization. On the other hand, if the stretch ratio exceeds 17, the film can be easily broken during the stretching, and stretched film 200 may be thinner than necessary so that it may have lower workability and handleability in later steps.

The stretching is not limited to single-stage stretching and may be multi-stage stretching. In this case, all stretching stages may be continuously performed before dyeing step S30, or second and later stretching stages may be performed simultaneously with a dyeing treatment and/or a cross-linking treatment in dyeing step S30. When such multi-stage stretching is performed, the stretching is preferably performed in such a way that the total of the stretch ratios in all stretching stages reaches more than 5.

The stretching may be longitudinal stretching that is performed in the longitudinal direction of the film (the film feed direction), transverse stretching that is performed in the widthwise direction of the film, or oblique stretching. The longitudinal stretching manner may be stretching between rolls that is performed using rolls, compressing stretching, stretching with chucks (clips), or the like. The transverse stretching manner may be tentering or the like. The stretching may be performed using any of a wet stretching method and a dry stretching method. A dry stretching method is preferably used in the point that the stretching temperature can be selected in a wide range.

The stretching temperature is set to higher than or equal to the temperature at which polyvinyl alcohol-based resin layer 6 and substrate film 30 have such a level of fluidity that they can be entirely stretched. The stretching temperature is preferably in the range of phase transition temperature (melting point or glass transition temperature) of substrate film 30 −30° C. to phase transition temperature +30° C., more preferably in the range of phase transition temperature −30° C. to phase transition temperature +5° C., even more preferably in the range of phase transition temperature −25° C. to phase transition temperature +0° C. When substrate film 30 is composed of two or more resin layers, the phase transition temperature means the highest of the phase transition temperatures of the two or more resin layers.

If the stretching temperature is lower than phase transition temperature −30° C., it may be difficult to achieve a high stretch ratio greater than 5, or substrate film 30 may have too low fluidity and tend to be difficult to be stretched. If the stretching temperature exceeds phase transition temperature +30° C., substrate film 30 may have too high fluidity and tend to be difficult to be stretched. The stretching temperature is more preferably higher than or equal to 120° C. in the above range, so that a high stretch ratio greater than 5 can be more easily achieved. This is because when the stretching temperature is higher than or equal to 120° C., the stretching can be performed with no difficulty even to a high stretch ratio greater than 5.

The method of heating laminated film 100 in the stretching may be a zone heating method (e.g., a method of heating in a stretching zone, such as a heating furnace, into which hot air is blown and which is adjusted to a certain temperature); a method of heating rolls that are used for the stretching; or a heater heating method (a method of heating with radiant heat from infrared heaters, halogen heaters, panel haters, or other heaters placed above and below laminated film 100). In the method of stretching between rolls, the zone heating method is preferred in view of stretching temperature uniformity. In this case, two nip roll pairs may be placed in a temperature controlled stretching zone or outside the stretching zone. Preferably, the two nip roll pairs are placed outside the stretching zone in order to prevent sticking between laminated film 100 and nip rolls.

In the case of the zone heating method, the stretching temperature means the temperature of the atmosphere in the zone (e.g., in a heating furnace). When heating is performed in a furnace in the heater heating method, the stretching temperature also means the temperature of the atmosphere in the furnace. In the method of heating rolls, the stretching temperature means the temperature of the roll surface.

A preheating step of preheating laminated film 100 may be performed before stretching step S20. The preheating method may be the same as the heating method in the stretching. When the stretching manner is stretching between rolls, the preheating may be performed at any time before, while, or after the film passes between nip rolls on the upstream side. When the stretching manner is hot roll stretching, the preheating is preferably performed at a time before the film passes between hot rolls. When the stretching manner is stretching with chucks, the preheating is preferably performed at a time before the distance between the chucks is widened. The preheating temperature is preferably in the range of stretching temperature −50° C. to stretching temperature ±0° C., more preferably in the range of stretching temperature −40° C. to stretching temperature −10° C.

After the stretching in stretching step S20, a heat setting step may be performed. The heat setting is a process of heating stretched film 200 at a temperature higher than or equal to the crystallization temperature while the ends of stretched film 200 are held under tension with clips. The heat setting facilitates the crystallization of polyvinyl alcohol-based resin layer 6'. The heat setting temperature is preferably in the range of stretching temperature −80° C. to stretching temperature −0° C., more preferably the range of stretching temperature −50° C. to stretching temperature −0° C.

(3) Dyeing Step S30

Figure 6:
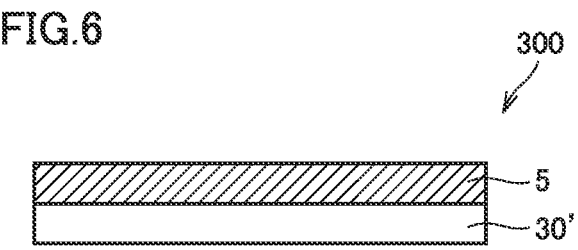
FIG. 6 is a schematic cross-sectional view showing an example of a layered structure of a polarizing laminated film obtained in a dyeing step.

Referring to FIG. 6, this step includes dyeing polyvinyl alcohol-based resin layer 6' of stretched film 200 with iodine and adsorbing and orienting the iodine to form polarizer 5. After this step, a polarizing laminated film 300 including substrate film 30' and polarizer 5 disposed on one or both surfaces thereof is obtained.

The dyeing step may be performed by immersing the whole of stretched film 200 in an iodine-containing solution (dyeing solution). The dyeing solution may be a solution obtained by dissolving iodine in a solvent. Water is generally used as the solvent for the dyeing solution. An organic solvent miscible with water may be further added to water. The dyeing solution preferably has an iodine concentration of 0.01 to 10% by weight, more preferably 0.02 to 7% by weight, even more preferably 0.025 to 5% by weight.

An iodide is preferably further added to the iodine-containing dyeing solution so that the efficiency of dyeing with iodine can be further improved. Examples of the iodide include potassium iodide, lithium iodide, sodium iodide, zinc iodide, aluminum iodide, lead iodide, copper iodide, barium iodide, calcium iodide, tin iodide, and titanium iodide. The dyeing solution preferably has an iodide concentration of 0.01 to 20% by weight. Among the iodides, potassium iodide is preferably added. When potassium iodide is added, the weight ratio of iodine to potassium iodide is preferably in the range of 1:5 to 1:100, more preferably in the range of 1:6 to 1:80, even more preferably in the range of 1:7 to 1:70.

Stretched film 200 is generally immersed in the dyeing solution for a time period in the range of 15 seconds to 15 minutes, preferably 30 seconds to 3 minutes. The temperature of the dyeing solution is preferably in the range of 10 to 60° C., more preferably in the range of 20 to 40° C.

Dyeing step S30 may also be performed before stretching step S20, or these steps may also be performed at the same time. However, dyeing step S30 is preferably performed after at least a certain level of stretching is performed on laminated film 100 so that iodine can be well oriented when adsorbed in the polyvinyl alcohol-based resin layer. Specifically, dyeing step S30 may be performed on stretched film 200 obtained by performing stretching until the target ratio is attained in stretching step S20, or stretching may be performed to a ratio lower than the target in stretching step S20, and then stretching may also be performed in dyeing step S30 until the total stretch ratio reaches the target ratio. The latter mode may be a process 1) that includes performing stretching to a ratio lower than the target in stretching step S20 and then performing stretching during the dyeing treatment in dyeing step S30 in such a way that the total stretch ratio reaches the target ratio. When a cross-linking treatment is performed after the dyeing treatment as described below, the latter mode may also be a process 2) that includes performing stretching to a ratio lower than the target in stretching step S20, then performing stretching to such an extent that the total stretch ratio is still lower than the target ratio, during the dyeing treatment in dyeing step S30, and then performing stretching during the cross-linking treatment in such a way that the total stretch ratio finally reaches the target ratio.

Dyeing step S30 may include a cross-linking treatment step that follows the dyeing treatment. The cross-linking treatment may be performed by immersing the dyed film in a cross-linking agent-containing solution (cross-linking solution). A conventionally known material may be used as the cross-linking agent, examples of which include boric acid, a boron compound such as borax, glyoxal, and glutaraldehyde. One cross-linking agent may be used alone, or two or more cross-linking agents may be used in combination.

The cross-linking solution may be specifically a solution obtained by dissolving a cross-linking agent in a solvent. For example, water may be used as the solvent. In addition to water, the solvent may further contain an organic solvent miscible with water. The concentration of the cross-linking agent in the cross-linking solution is preferably in the range of 1 to 20% by weight, more preferably in the range of 6 to 15% by weight.

The cross-linking solution may contain an iodide. The addition of an iodide allows polarizer 5 to have more uniform in-plane polarization performance. Examples of the iodide include potassium iodide, lithium iodide, sodium iodide, zinc iodide, aluminum iodide, lead iodide, copper iodide, barium iodide, calcium iodide, tin iodide, and titanium iodide. The cross-linking solution preferably has an iodide concentration of 0.05 to 15% by weight, more preferably 0.5 to 8% by weight.

The dyed film is generally immersed in the cross-linking solution for a time period of 15 seconds to 20 minutes, preferably 30 seconds to 15 minutes. The temperature of the cross-linking solution is preferably in the range of 10 to 90° C.

The cross-linking agent may be added to the dyeing solution so that the cross-linking treatment can be performed simultaneously with the dyeing treatment. The stretching may also be performed during the cross-linking treatment. A specific mode in which stretching is performed during the cross-linking treatment is as described above. The treatment of immersion in the cross-linking solution may also be performed twice or more using two or more cross-linking solutions with different compositions.

After dyeing step S30, a washing step and a drying step are preferably performed before first bonding step S40 described below. The washing step generally includes a water washing step. The water washing treatment may be performed by immersing the dyed or cross-linked film in pure water such as ion-exchanged water or distilled water. The water washing temperature is generally in the range of 3 to 50° C., preferably in the range of 4 to 20° C. The time period of immersion in water is generally 2 to 300 seconds, preferably 3 to 240 seconds.

The washing step may be a combination of the water washing step and the step of washing with an iodide solution. The washing liquid for use in the water washing step and/or the step of washing with an iodide solution may contain water and optionally a liquid alcohol such as methanol, ethanol, isopropyl alcohol, butanol, or propanol.

The drying step performed after the washing step may use any appropriate method such as air drying, air blow drying, or drying by heating. For example, in the case of drying by heating, the drying temperature is generally 20 to 95° C., and the drying time is generally about 1 to about 15 minutes. After the steps described above, polarizing laminated film 300 having polarizer 5 is obtained.

(4) First Bonding Step S40

Figure 7:
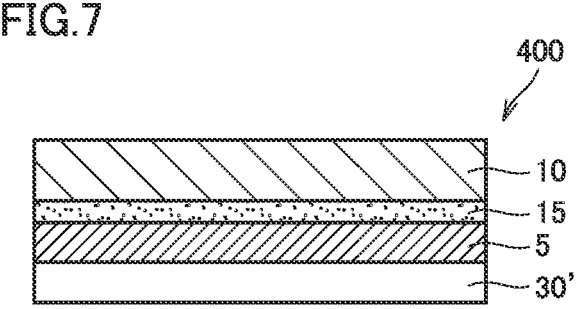
FIG. 7 is a schematic cross-sectional view showing an example of a layered structure of a laminate film obtained in a first bonding step.

Referring to FIG. 7, this step includes bonding a first protective film 10 onto polarizer 5 of polarizing laminated film 300, specifically bonding first protective film 10 to the surface of polarizer 5 opposite to its substrate film 30' side, to obtain a laminate film 400. When polarizing laminated film 300 has polarizers 5 on both surfaces of substrate film 30', first protective films 10 are generally bonded to both polarizers 5, respectively. In this case, first protective films 10 may be of the same or different types.

First protective film 10 may be bonded to polarizer 5 with a first adhesive layer 15 interposed therebetween. The adhesive used to form first adhesive layer 15 and the method of bonding the protective film and polarizer 5 together with the adhesive are as described above. First protective film 10 and polarizer 5 may also be bonded with the above pressure-sensitive adhesive layer interposed therebetween.

Before first protective film 10 is bonded to polarizer 5, the polarizer 5-side surface of first protective film 10 may be subjected to a surface treatment (adhesion promoting treatment) such as a plasma treatment, a corona treatment, an ultraviolet irradiation treatment, a flame treatment, or a saponification treatment in order to have improved adhesion to polarizer 5. In particular, a plasma treatment, a corona treatment, or a saponification treatment is preferably performed. For example, when first protective film 10 includes a cyclic polyolefin-based resin, a plasma treatment or a corona treatment is generally performed. When first protective film 10 includes a cellulose ester-based resin, a saponification treatment is generally performed. The saponification treatment may be a method of immersing the film in an aqueous solution of an alkali such as sodium hydroxide or potassium hydroxide.

(5) Peeling Step S50

This step includes peeling off substrate film 30' from laminate film 400 obtained after first protective film 10 is bonded. After this step, a single side protective film-bearing polarizing plate 2 is obtained in which first protective film 10 is disposed on one surface of polarizer 5 as shown in FIG. 2. When polarizing laminated film 300 has polarizers 5 on both surfaces of substrate film 30' and first protective films 10 are bonded to both polarizers 5, two pieces of single side protective film-bearing polarizing plates 2 are obtained from a single piece of polarizing laminated film 300 after peeling step S50.

The method of peeling off substrate film 30' is not particularly limited. Substrate film 30' can be peeled off by the same method as in the step of peeling off a separator (release film) that is performed on a common pressure-sensitive adhesive-bearing polarizing plate. Substrate film 30' may be peeled off immediately after first bonding step S40. Alternatively, after first bonding step S40, the film may be wound into a roll, and then substrate film 30' may be peeled off while the roll is unwound in a later step.

(6) Second Bonding Step S60

This step includes bonding a second protective film 20 to polarizer 5 of single side protective film-bearing polarizing plate 2, specifically bonding second protective film 20 to the surface opposite to the surface to which first protective film 10 is bonded in first bonding step S40, to obtain a double side protective films-bearing polarizing plate 1 as shown in FIG. 1.

Second protective film 20 may be bonded to polarizer 5 with a second adhesive layer 25 interposed therebetween. The adhesive used to form second adhesive layer 25 and the method of bonding the protective film and polarizer 5 together with the adhesive are as described above. Second protective film 20 and polarizer 5 may also be bonded with the above pressure-sensitive adhesive layer interposed therebetween. The description of first bonding step S40 is quoted herein with respect to the surface treatment (adhesion promoting treatment) for bonding second protective film 20.

(7) Control of Retardation Properties of Polarizer

In the production method described above, examples of the method for preparing the polarizer having the specific retardation properties according to the invention include, but are not particularly limited to, a method of controlling the stretching conditions in the stretching step and a method of controlling the dyeing conditions in the dyeing step.

In the method of controlling the stretching conditions in the stretching step, stretching needs to be performed as mildly as possible, and stretching needs to be performed in such a way that the amorphous layer is oriented as highly as possible. In other words, conditions for exclusively and significantly growing crystals are not preferred. Therefore, the temperature conditions in the stretching step is preferably as low as possible. In particular, it is preferable not to perform stretching at higher than or equal to 170° C. where polyvinyl alcohol resin can crystallize significantly. When a polyvinyl alcohol-based resin thin film is handled as in the invention, careful operation is necessary, because heat can be abruptly applied particularly to such a thin film, so that the crystallinity of such a thin film can increase more sharply than that of a film with a normal thickness even when the conditions used are intended to be mild.

Multi-stage stretching may be performed. In this case, if a low-ratio stretching stage is performed at a high temperature, crystallization can occur preferentially over orientation by stretching. In particular, therefore, a low-ratio stretching stage is preferably performed at a low temperature. Specifically, stretching to a stretch ratio less than or equal to 2 is preferably performed at lower than or equal to 150° C., more preferably at lower than or equal to 140° C. In addition, stretching to a stretch ratio greater than or equal to 2 is also preferably performed at lower than or equal to 150° C. On the other hand, in final or near-final stretching, a zone at 150° C. to 170° C. is provided, in which heat is preferably applied for a short period of time. This can fix the orientation. In this case, since heat is applied in final or near-final stretching, the amorphous part can be already oriented enough, so that lamellar crystal growth will be less likely to occur and a problem will hardly occur. This is advantageous in that the orientation of the amorphous part can be fixed by hydrogen bonding. In this regard, any zone in which heat is applied at a temperature higher than 150° C. should preferably be as short as possible because such a zone can degrade the dyeability.

The most preferred stretching method may be as follows. In a stage or stages where the stretch ratio is less than or equal to 2, stretching is performed at a temperature of 90 to 140° C. In a stage or stages where the stretch ratio is greater than or equal to 2, stretching is performed at a temperature of 100 to 150° C. In the final stretching stage, heating at a temperature higher than or equal to 50° C. is performed for a short time less than or equal to 30 seconds However, this stretching method is not limited to the above method.

In addition, it is not necessary to complete all stretching stages in the stretching step. A method that includes performing stretching only to a low stretch ratio in the stretching step and further performing stretching in the dyeing step is also very effective. In this case, there is the advantage that crystallization does not occur so much in the stretching step, so that the orientation of the amorphous part can be efficiently increased in the dyeing step.

In the stretching step, therefore, crystallization is prevented at a stage where the orientation of polyvinyl alcohol is low, so that the lamellar crystal content can be reduced. As a result, the orientation of the amorphous part can be increased, so that a polyvinyl alcohol-iodine complex having a long-wavelength absorption band, which is in turn important for the suppression of red discoloration, can be formed in an advantageous manner. In this regard, however, since actual formation of the complex is controlled by the dyeing step, the specific retardation properties according to the invention would be difficult to be achieved only by the control in the stretching step. Therefore, the optimization in the dyeing step shown below is also important.

In the dyeing step, it is important not only to allow iodine to efficiently enter the film but also to prevent the degradation of the orientation of polyvinyl alcohol as much as possible. In the dyeing step, the film can be efficiently impregnated with iodine by being immersed for a short time in a dyeing solution containing iodine at a high concentration. Specifically, the concentration of iodine in the dyeing solution is preferably greater than or equal to 6 mM, more preferably greater than or equal to 8 mM. The concentration is even more preferably greater than or equal to 10 mM, and the treatment is preferably performed for a short period of time.

In this case, it is also important to continue applying a tension in the stretching direction to the film so that relaxation of the orientation can be prevented. The tension per 1 m width applied in the stretching direction to the film is preferably greater than or equal to 100 N, more preferably greater than or equal to 200 N, most preferably greater than or equal to 300 N.

In the subsequent cross-linking treatment, relaxation of the orientation of polyvinyl alcohol can be prevented by efficiently performing cross-linking with boric acid at a stage as early as possible. For this purpose, it is effective to perform the cross-linking by using two or more cross-linking solutions with different compositions. Specifically, at least the first-stage cross-linking chamber preferably contains a cross-linking solution containing 0 to 3 parts by weight of an iodide (such as potassium iodide) based on 100 parts by weight of water. When the iodide content is reduced, crosslinking with a cross-linking agent (such as boric acid) can be efficiently performed at an early stage of the cross-linking treatment. This makes it possible to suppress relaxation of the orientation of the polyvinyl alcohol-based resin in a high-temperature chemical solution. In order to control the hue, the second or later stage cross-linking chamber may contain a cross-linking solution containing greater than or equal to 3 parts by weight of an iodide based on 100 parts by weight of water.

At this stage, it is also important to maintain a tension in the stretching direction on the film. The tension per 1 m width in the stretching direction on the film is preferably greater than or equal to 200 N, more preferably greater than or equal to 300 N, most preferably greater than or equal to 400 N.

EXAMPLES

Hereinafter, the invention will be more specifically described with reference to examples and comparative examples, but the invention is not limited these examples and comparative examples.

Example 1

(1) Primer Layer Forming Step

A polyvinyl alcohol powder (Z-200 manufactured by The Nippon Synthetic Chemical Industry Co., Ltd., 1,100 in average polymerization degree, 99.5 mol % in saponification degree) was dissolved in hot water at 95° C. to form a 3% by weight polyvinyl alcohol aqueous solution. A primer layer-forming coating liquid was obtained by mixing the resulting aqueous solution and a cross-linking agent (Sumirez Resin 650 manufactured by Taoka Chemical Co., Ltd.) in such a way that the weight ratio of the crosslinking agent to the polyvinyl alcohol powder was 5 to 6.

Subsequently, a 90-µm-thick unstretched polypropylene (PP) film (melting point: 163° C.) was provided as a substrate film, and one surface of the film was subjected to a corona treatment. Subsequently, the primer layer-forming coating liquid was applied to the corona-treated surface using a micro-gravure coater, and then dried at 80° C. for 10 minutes to form a 0.2-µm-thick primer layer.

(2) Preparation of Laminated Film (Resin Layer Forming Step)

A polyvinyl alcohol powder (PVA 124 manufactured by KURARAY CO., LTD., 2,400 in average polymerization degree, 98.0-99.0 mol % in saponification degree) was dissolved in hot water at 95° C. to form an 8% by weight polyvinyl alcohol aqueous solution, and this was used as a polyvinyl alcohol-based resin layer-forming coating liquid.

Using a lip coater, the polyvinyl alcohol-based resin layer-forming coating liquid was applied to the surface of the primer layer on the substrate film prepared in step (1). The coating was then dried at 80° C. for 20 minutes to form a polyvinyl alcohol-based resin layer 6 on the primer layer, so that a laminated film composed of the substrate film, the primer layer, and the polyvinyl alcohol-based resin layer was obtained.

(3) Preparation of Stretched Film (Stretching Step)

Using a floating longitudinal uniaxial stretching machine, the laminated film prepared in step (2) was stretched to 2.0 times at 100° C., then subjected to free-end uniaxial stretching to 5.8 times at 140° C., and finally heat-treated at 160° C. for 10 seconds to form a stretched film. After the stretching, the polyvinyl alcohol-based resin layer had a thickness of 6.5

(4) Preparation of Polarizing Laminated Film (Dyeing Step)

The polyvinyl alcohol-based resin layer was dyed by immersing the stretched film prepared in step (3) for about 180 seconds in a dyeing aqueous solution at 30° C. containing iodine and potassium iodide (containing 0.6 parts by weight of iodine and 10 parts by weight of potassium iodide based on 100 parts by weight of water). During this step, the tension in the stretching direction was kept at 600 N per 1 m width.

Subsequently, the dyed film was immersed for 120 seconds in a first cross-linking aqueous solution at 78° C. containing boric acid (containing 9.5 parts by weight of boric acid based on 100 parts by weight of water) and then immersed for 60 seconds in a second cross-linking aqueous solution at 70° C. containing boric acid and potassium iodide (containing 9.5 parts by weight of boric acid and 4 parts by weight of potassium iodide based on 100 parts by weight of water) so that a cross-linking treatment was performed. Subsequently, the film was washed with pure water at 10° C. for 10 seconds and finally dried at 40° C. for 300 seconds. During this step, the tension in the stretching direction was kept at 1,000 N per 1 m width. As a result of the above steps, a polarizing laminated film composed of the substrate film, the primer layer, and a polarizer was obtained.

(5) Preparation of Double Side Protective Films-Bearing Polarizing Plate (First Bonding Step, Peeling Step, Second Bonding Step)

A polyvinyl alcohol powder (KL-318 manufactured by KURARAY CO., LTD., 1,800 in average polymerization degree) was dissolved in hot water at 95° C. to form a 3% by weight polyvinyl alcohol aqueous solution. An aqueous adhesive solution was prepared by mixing the resulting aqueous solution and a cross-linking agent (Sumirez Resin 650 manufactured by Taoka Chemical Co., Ltd.) in such a way that the weight ratio of the crosslinking agent to the polyvinyl alcohol powder was 1 to 2.

Subsequently, after the aqueous adhesive solution was applied to the polarizer of the polarizing laminated film prepared in step (4), a first protective film [KC4UY manufactured by Konica Minolta Opto Co., Ltd. (a transparent protective film made of triacetylcellulose (TAC)] having undergone saponification was bonded to the bonding surface. The films were then pressure-bonded by being allowed to pass between a pair of bonding rolls. Subsequently, the resulting laminate was dried in an oven at 80° C. for 2 minutes so that the first protective film was bonded onto the polarizer layer. The resulting laminate film had a layered structure composed of the first protective film, the adhesive layer, the polarizer, the primer layer, and the substrate film (first bonding step).

Subsequently, the substrate film was peeled off from the resulting laminate film (peeling step). The substrate film was easily peeled off, so that a single side protective film-bearing polarizing plate was obtained having a layered structure composed of the first protective film, the adhesive layer, the polarizer, and the primer layer.

Finally, a second protective film [ZF14 manufactured by Zeon Corporation (a transparent protective film made of a cyclic polyolefin-based resin)] with a bonding surface having undergone a corona treatment was bonded, with an ultraviolet-curable adhesive, to the surface of the resulting single side protective film-bearing polarizing plate opposite to its first protective film-side surface. The adhesive layer was then cured by ultraviolet irradiation, so that a double side protective films-bearing polarizing plate was obtained having a layered structure composed of the first protective film, the adhesive layer, the polarizer, the primer layer, the adhesive layer, and the second protective film.

Example 2

A double side protective films-bearing polarizing plate was prepared in the same manner as in Example 1, except that the tension in the dyeing treatment and the tension in the cross-linking treatment were changed to 300 N and 600 N, respectively.

Example 3

A double side protective films-bearing polarizing plate was prepared in the same manner as in Example 1, except that a cross-linking aqueous solution containing 9.5 parts by weight of boric acid and 2 parts by weight of potassium iodide based on 100 parts by weight of water was used instead of the first cross-linking aqueous solution (containing 9.5 parts by weight of boric acid based on 100 parts by weight of water).

Example 4

A double side protective films-bearing polarizing plate was prepared in the same manner as in Example 1, except that the stretching step was performed in such a way that the film was stretched to 2.0 times at 140° C., then subjected to free-end uniaxial stretching to 5.8 times at 150° C., and finally heat-treated at 160° C. for 10 seconds.

Example 5

A double side protective films-bearing polarizing plate was prepared in the same manner as in Example 1, except that the stretching step was performed in such a way that the film was stretched to 2.0 times at 140° C., then subjected to free-end uniaxial stretching to 5.8 times at 160° C., and finally heat-treated at 160° C. for 10 seconds.

Comparative Example 1

A double side protective films-bearing polarizing plate was prepared in the same manner as in Example 1, except that the stretching step was performed in such a way that the film was stretched to 2.0 times at 170° C., then subjected to free-end uniaxial stretching to 5.8 times at the same temperature of 170° C., and finally heat-treated at 160° C. for 10 seconds.

Comparative Example 2

A double side protective films-bearing polarizing plate was prepared in the same manner as in Example 1, except that the stretching step was performed in such a way that the film was stretched to 2.0 times at 170° C., then subjected to free-end uniaxial stretching to 5.8 times at 160° C., and finally heat-treated at 160° C. for 10 seconds.

Comparative Example 3

A double side protective films-bearing polarizing plate was prepared in the same manner as in Example 1, except that the tension in the dyeing treatment and the tension in the cross-linking treatment were changed to 50 N and 80 N, respectively. After the dyeing, the polarizer was observed to be partially dissolved. Relaxation of the orientation was also visually observed during the dyeing step.

Comparative Example 4

A double side protective films-bearing polarizing plate was prepared in the same manner as in Example 1, except that a cross-linking aqueous solution containing 9.5 parts by weight of boric acid and 10 parts by weight of potassium iodide based on 100 parts by weight of water was used instead of the first cross-linking aqueous solution (containing 9.5 parts by weight of boric acid based on 100 parts by weight of water).

[Measurement of Retardation and Polarizing Properties and Evaluation of Red Discoloration in Heat Resistance Test]

(1) Measurement of Retardation of Polarizer

The first protective film (triacetylcellulose) of the polarizing plate obtained in each of the examples and the comparative examples was dissolved with methylene chloride, and the second protective film (cyclic polyolefin-based resin) was dissolved with cyclohexane, so that the polarizer was isolated. The resulting polarizer was measured for Rpva and Ri values at a wavelength of 1,000 nm using a retardation analyzer (KOBRA-WPR/IR manufactured by Oji Scientific Instruments Co., Ltd.).

(2) Measurement of Polarizing Properties of Polarizer

The polarizer obtained in each of the examples and the comparative examples (in the form of the polarizing laminated film before the bonding of the protective film) was measured for visibility correction single transmittance (Ty) and visibility correction degree (Py) of polarization using an absorption photometer (V7100 manufactured by JASCO Corporation). Table 1 shows the results. In the measurement, the polarizing laminated film was so set that light was incident on its polarizer side.

(3) Evaluation of Red Discoloration of Polarizing Plate in Heat Resistance Test

Two 10-cm-long strip samples were cut from the double side protective films-bearing polarizing plate obtained in each of the examples and the comparative examples. These samples were bonded to both surfaces of a glass sheet with a pressure-sensitive adhesive. In this process, the second protective film ZF14 side was located on the glass sheet side, and the samples were placed in a crossed Nicols arrangement on both surfaces. The glass sheet with the samples bonded thereto was stored in an oven at 85° C. for 500 hours, then taken out of the oven, and visually evaluated for red discoloration on a backlight in a dark room. The level of red discoloration was evaluated using the indices shown below. Lv1 to Lv3 were evaluated as being acceptable. Table 1 shows the results.

Lv1: A level at which no red discoloration is observed at all.

Lv2: A level at which a deep-black state is maintained with no visible red discoloration.

Lv3: A level at which almost no red discoloration is observed although the color looks slightly lighter than that before the heat resistance test.

Lv4: A level at which the color entirely changes to reddish.

Lv5: A level at which the color completely changes to red.

TABLE 1

|  | Stretching temperature (° C.) To 2 times/to greater than or equal to 2 times | Tension (N) Dyeing/cross-linking | Amount of KI in cross-linking chamber 1 | Polarizing plate TAC/PVA/COP Initial |  |  |  |  | Red discoloration |
|---|---|---|---|---|---|---|---|---|---|
|  |  |  |  | Ri | Rpva | Ri/Rpva | Ty | Py | Lv |
| Example 1 | 100/140 | 600/1000 | 0 parts | 164.7 | 342.1 | 0.482 | 41.6 | 99.9964 | Lv1 |
| Example 2 | 100/140 | 300/600 | 0 parts | 161.7 | 344.5 | 0.469 | 41.4 | 99.9956 | Lv2 |
| Example 3 | 100/140 | 600/1000 | 2 parts | 164.6 | 341.5 | 0.482 | 41.6 | 99.9980 | Lv1 |
| Example 4 | 140/150 | 600/1000 | 0 parts | 155.6 | 347.7 | 0.448 | 41.4 | 99.9967 | Lv2 |
| Example 5 | 140/160 | 600/1000 | 0 parts | 136.3 | 343.1 | 0.397 | 41.8 | 99.9942 | Lv3 |
| Comparative Example 1 | 170/170 | 600/1000 | 0 parts | 132.1 | 372.1 | 0.355 | 41.7 | 99.9950 | Lv5 |
| Comparative Example 2 | 170/160 | 600/1000 | 0 parts | 136.5 | 380.6 | 0.359 | 41.6 | 99.9962 | Lv4 |
| Comparative Example 3 | 100/140 | 50/80 | 0 parts | 118.1 | 320.5 | 0.368 | 42.2 | 99.9880 | Lv5 |
| Comparative Example 4 | 100/140 | 600/1000 | 10 parts | 133.1 | 358.9 | 0.371 | 41.7 | 99.9952 | Lv4 |

REFERENCE SIGNS LIST

1 polarizing plate, 2 single side protective film-bearing polarizing plate, 5 polarizer, 10 first protective film, 15 first adhesive layer, 20 second protective film, 25 second adhesive layer, 6 polyvinyl alcohol-based resin layer, 6' stretched polyvinyl alcohol-based resin layer, 30 substrate film, 30' stretched substrate film, 100 laminated film, 200 stretched film, 300 polarizing laminated film, 400 laminate film.

The invention claimed is:

1. A polarizer, comprising: a polyvinyl alcohol-based resin layer; and iodine adsorbed and oriented in the polyvinyl alcohol-based resin layer,
   the polarizer having a thickness less than or equal to 10 μm and a ratio of a retardation of iodine to a retardation of polyvinyl alcohol greater than or equal to 0.38 at a wavelength of 1000 nm,
   the retardation of polyvinyl alcohol and the retardation of iodine being values determined from fitting parameters that are obtained by fitting retardation values at a wavelength greater than or equal to 850 nm to the Sellmeier formula by least squares method, and
   the polarizer having a visibility correction single transmittance greater than or equal to 40.0% and a visibility correction degree of polarization greater than or equal to 99.9942%.

2. A polarizing plate comprising the polarizer according to claim 1.

3. The polarizing plate according to claim 2, further comprising a protective film bonded to at least one surface of the polarizer.

4. The polarizer according to claim 1, wherein the visibility correction single transmittance is greater than or equal to 41.4%.

5. The polarizer according to claim 1, wherein the retardation of polyvinyl alcohol is greater than or equal to 341.5 nm.

6. The polarizer according to claim 1, wherein the retardation of iodine is greater than or equal to 136.3 nm.

* * * * *